United States Patent

Gaechter et al.

[11] Patent Number: 6,081,327
[45] Date of Patent: *Jun. 27, 2000

[54] LEVELING INSTRUMENT

[75] Inventors: Bernhard Gaechter, Balgach; Bernhard Braunecker, Rebstein, both of Switzerland

[73] Assignee: Leica Geosystems AG, Heerbrugg, Switzerland

[*] Notice: This patent issued on a continued prosecution application filed under 37 CFR 1.53(d), and is subject to the twenty year patent term provisions of 35 U.S.C. 154(a)(2).

[21] Appl. No.: 08/836,877
[22] PCT Filed: Jan. 18, 1996
[86] PCT No.: PCT/EP96/00197
§ 371 Date: May 28, 1997
§ 102(e) Date: May 28, 1997
[87] PCT Pub. No.: WO96/24820
PCT Pub. Date: Aug. 15, 1996

[30] Foreign Application Priority Data

Feb. 8, 1995 [DE] Germany .............. 195 04 039

[51] Int. Cl.[7] ................................................ G01C 9/02
[52] U.S. Cl. ........................................................ 356/247
[58] Field of Search ..................... 356/399–401, 356/138, 375, 247, 141.2, 141.3, 141.4, 152.2; 33/293, 294, 295, 296, DIG. 21, 286, 228, 290; 250/201.1–201.9; 235/454, 462.35, 462.42

[56] References Cited

U.S. PATENT DOCUMENTS

| 4,404,594 | 9/1983 | Hannan . |
| 4,715,714 | 12/1987 | Gaechter et al. . |
| 4,718,171 | 1/1988 | Schlemmer et al. .............. 356/399 |
| 5,298,989 | 3/1994 | Tsukahara et al. . |
| 5,627,366 | 5/1997 | Katz . |
| 5,770,843 | 6/1998 | Olmstead . |

FOREIGN PATENT DOCUMENTS

| 6276589A2 | 8/1988 | European Pat. Off. . |
| 551984A1 | 7/1993 | European Pat. Off. . |
| 0 576 004 | 12/1993 | European Pat. Off. . |
| 34 24 806 | 4/1988 | Germany . |
| 3424806C2 | 4/1988 | Germany . |

*Primary Examiner*—K. P. Hantis
*Attorney, Agent, or Firm*—Foley & Lardner

[57] ABSTRACT

A leveling instrument has an image-forming objective, a picture-taking spatial resolution optoelectronic detector, and electronics and a computing unit for driving the detector and evaluating the detector signals. The image-forming objective is subdivided into several zones of field depth designed each as a different aperture plate. Corresponding partial zone of the detector are associated to the aperture plate. The partial zones of the detector may also be designed as individual spatial resolution detectors. Since all level indicators, whatever their distance from the levelling instrument, may be sensed in one of the zones of field depth designed as aperture plates and reproduced by said aperture plate, the image-forming objective need not be manually or automatically refocused nor aligned with respect to the target.

30 Claims, 4 Drawing Sheets

LEVELING INSTRUMENT

BACKGROUND

The invention relates to a leveling instrument having an imaging optical system and a spatially resolving optoelectronic detector for image recording, and having an electronic system and an arithmetic unit for controlling the detector and for image evaluation.

Devices of the said type are disclosed in German Publication DE 34 24 806 C2 and U.S. Pat. No. 4,715,714. The leveling instrument described there determines the distance and the height difference relative to leveling rods set up at a distance. It therefore serves in geodetic surveying for determining benchmarks and for topographic and cartographic surveying. However, it is also used in construction surveying, in building traffic ways or in building tunnels and in mining.

In the classic leveling instrument, its telescope is used by the operator for the purpose of visually reading off the numerical value on a height scale of the leveling rod. The numerical value read off is located exactly on the optical axis in the cross hairs of the telescope.

The advent of automated digital leveling instruments rendered it possible for the first time to read off rods electronically. For this purpose, a leveling rod has been developed on which a code pattern composed of black and white elements is applied. In accordance with DE 34 24 806 C2, the portion of the code pattern situated in the field of view of the telescope optical system of the digital leveling instrument is imaged on a spatially resolving optoelectronic detector group. In this process, use is made not only of the code pattern information located on the optical axis of the telescope, but also of the code pattern information located in the entire field of view of the telescope, in order to determine the height value. In addition, the position sensor of the focusing device of the digital leveling instrument supplies the approximate distance from the leveling rod. The exact distance is determined by the evaluation procedure of the recorded code pattern.

The leveling operation runs as follows. The leveling rod is sighted using the telescope of the leveled leveling instrument, and focused using the focusing device. The position sensor of the focusing device supplies the distance from the leveling rod, from which, together with the focal length of the telescope objective, the distance scale is calculated. This distance scale is included in the code pattern, in order to be able to carry out a comparison with a reference code pattern. The latter is located as an original code pattern of the leveling rod in an electronic memory. A cross correlation which determines a best possible agreement of the measured code pattern section with a corresponding section on the reference code pattern is carried out as comparison method. The agreement found reveals the sighted location on the leveling rod, and thus the height of the leveling rod with respect to the leveling instrument.

Although the actual leveling and measuring operation is performed fully automatically, it is necessary for the imaging optical system of the leveling instrument to be set in advance such that the leveling rod is sharply imaged in the intermediate image plane of the telescope objective. For this purpose, a focusing lens can be mechanically displaced along the optical axis of the telescope optical system. The focusing lens is firmly connected to a focusing drive. The focusing drive is actuated manually and at the same time the image of the leveling rod is observed through the telescope eyepiece. The focusing operation is terminated when the image of the leveling rod appears sharp.

An electronic leveling instrument of the said type is also described in EP 0 576 004 A1. A telescope is used as imaging optical system. The telescope is focused onto a leveling rod whose distance and height are to be determined with respect to the leveling instrument. A black and white pattern of lines is applied to the leveling rod. The objective of the telescope picks up that part of the pattern of lines of the leveling rod which is located in its field of view, and generates therefrom an image on a photoelectric receiver. The electric signals of the receiver are evaluated in a signal processor directly or via a Fourier transformation. In the process, the distance between the leveling instrument and leveling rod, and the leveling height are determined from the period and from the phase of the pattern of lines picked up by the telescope objective and evaluated by the photoelectric device.

The focusing of the telescope onto the leveling rod is performed manually. For this purpose, a focusing lens is displaced along the optical axis of the telescope until the image of the leveling rod observed through the telescope eyepiece appears sharp.

in another design, the focusing lens is motorized, and this renders automated focusing possible. In this case, the focusing lens is moved in steps with the aid of a motor control. With each step, the detector records the pattern of lines of the leveling rod, and the signal processor forms the Fourier transform therefrom. The height of the peak, corresponding to the periodic structure of the pattern of lines, of the Fourier transform is a measure of the focusing. The maximum peak height of this Fourier transform signifies optimum focusing. Consequently, the focusing lens is brought to this position after passing through the maximum peak height.

The two digital leveling systems according to DE 34 24 806 C2 and U.S. Pat. No. 4,715,714 and to EP 0 576 004 A1 require moving optical and mechanical components to focus the leveling rod. Such components, which are moved mechanically in relation to one another, have to be produced and adjusted with care. This complicates production and increases cost.

In addition, the manual focusing is somewhat troublesome for the user of the leveling instrument: the user has to look through the eyepiece of the telescope and subjectively estimate the focusing of the leveling rod image. Although the motorized version of the focusing lens relieves the user of this work, this is achieved at the expense of a high outlay for measurement. Thus, the leveling rod image must be recorded by the detector and processed in a microprocessor with the aid of suitable algorithms. The computational result must be converted by an electronic motor control, the electric motor must be driven, and the focusing lens must be moved to the appropriate position. The position must be known via a position sensor or, in the case of the use of a stepping motor, at least via the counting steps, in order to be able to move back to this position again after passing through the optimum focusing position. Moreover, the probability of the failure of an instrument is increased by the additional extent of software, electronics and, in particular, electromechanics, because of the finite service life of the electric motor.

SUMMARY OF THE INVENTION

Consequently, it is an object of the invention to develop a leveling instrument which sharply images a leveling rod set up at any desired distances without refocusing and without mechanical adjustment.

This object is achieved according to the invention when, for the purpose of producing sharp images from different distance ranges, the imaging optical system has at least two differently imaging pupil zones simultaneously examining different distance ranges.

Advantageous developments and improvements of the invention are characterized by the features described below.

In the invention, or object located at a specific distance is imaged in the conjugate intermediate image plane of a telescope when the latter is focused. Each point of the object is imaged in a punctiform fashion. The points of other objects which are situated nearer to or further from the telescope produce circles of confusion in the intermediate image planes of the telescope. The diameters of these circles turn out larger the further the object is removed from the focused object plane. In the case in which the diameters of the circles of confusion remain smaller than the distance between the light-sensitive structures of a spatially resolving detector arranged in an intermediate image plane, the detector records the areas of the circles of confusion as points. Under this condition of the maximum permissible diameter of the circles of confusion, the imaging equation yields a specific distance range, which the detector images sharply. This distance range, referred to as the depth of field, is larger the larger the distances between the light-sensitive elements of the detector, that is to say the poorer the resolving power of the latter.

It is normal to use linear diode rows of two-dimensional position-sensitive CCD arrays as position-sensitive optoelectronic detectors for the digital leveling instruments. Said arrays receive the image of the leveling rod via a beam splitter arranged in the beam path of the telescope. Because of the beam splitting, said beam splitter permits simultaneous observation of the leveling rod via the telescope eyepiece. During observation of the leveling rod through the telescope eyepiece, with its discrete light-sensitive elements, the observer's retina serves as the position-sensitive detector. Thus, the resolving power of the eye contributes to the depth of field of the objects seen by the observer.

In addition to the resolving power of the detector, the data for the optical system used also features in the determination of the depth of field. Thus, it is generally known that when the f-number is high the depth of field is also high. Thus, a role is also played by the size of the aperture stop, the focal length of the telescope objective, and also the distance from the object itself. Geometrical objective aberrations and diffraction effects also exert an additional influence.

Thus, overall the depth of field of an electronic leveling instrument is determined by the objective used and the detector used. If the leveling rod is located at a distance outside the instantaneously set distance including its associated depth of field, it is necessary to use a focusing lens to refocus in the conventional way described above and to set a different distance range at the leveling instrument. In accordance with the present invention, this setting is eliminated and all the devices bound up therewith are eliminated. The maximum (possibly infinite) distance of the leveling rod is split into individual distance ranges which, according to the invention, are assigned to the depths of field of the differently imaging pupil zones of the imaging optical system. An imaging optical system configured in such a way receives the light coming from the leveling rod with each of its imaging pupil zones, and generates a complete image of the leveling rod. However, only one of these imaging pupil zones images the leveling rod sufficiently sharply to enable an evaluation. The leveling rod is then located precisely in the depth of field of this imaging zone.

The differently imaging pupil zones according to the invention of the imaging optical system, which are assigned to the different distance ranges, can be realized in different ways. In the simplest case, individual apertures are arranged separately next to one another. They can have aperture areas of different size for the light admission, and focal lengths or image distances of different size. Refractive and/or diffractive optical elements are used as imaging elements. The individual apertures can be represented by conventional objectives with explicitly refractive elements whose different refractive powers signify corresponding focal lengths. These are tuned to one another in such a way that they sharply image all desired distances between the leveling instrument and leveling rod. Each objective focuses the objects (leveling rod) of its depth of field on to a single spatially resolving detector assigned to it or, via beam deflection, on to a subregion, assigned to it, of a common spatially resolving detector. In order still to receive an adequate quantity of light from objects further removed, the appropriate objectives are frequently equipped with a larger aperture area.

A differently designed version of the subject matter of the invention comprises a substantially more compact design with only a single aperture which is itself split into individual, differently imaging pupil zones. Here, as well, each pupil zone has a different focal length and/or imaging distance. Corresponding to these in accordance with the image equation, and taking account of the circles of confusion, are specific distance ranges which are imaged sharply onto the assigned detectors or the assigned subregions of a common detector. If the focal lengths of the individual pupil zones are of the same size, different focal lengths are selected in accordance with the distance ranges, and individual detectors are arranged in the image planes.

The individual pupil zones of the aperture can be designed in a rotationally symmetrical fashion relative to an axis. However, this is not a necessary condition, and so the pupil zones can also have aperture areas of any size and any shape. The imaging characteristics are realized by refractive or by diffractive optical elements, or also by a combination of these types of imaging.

Small openings signify large depths of field. However, this can give rise to intensity problems. Thus, active illumination of the leveling rod may be required for radiometric reasons. The illumination is best performed using a spotlight. The illumination beam path can be guided by being reflected in via a beam splitter and guided through the imaging pupil zones. It is also possible for a spotlight to be integrated into the leveling instrument independently of the apertures, or to be mounted on the leveling instrument. A light-emitting diode or laser diode emitting in the near infrared can serve as radiation source, for example. Many optoelectronic detectors are particularly sensitive in this wavelength region.

The differently imaging pupil zones of an aperture, or a group of differently imaging separately arranged apertures cover the entire relevant distance range for an electronic leveling instrument by virtue of their depths of field. In mathematical terms, the large depth of field is achieved by a suitable spatial configuration of the optical pupil function which is yielded from the distribution of the complex wave amplitudes in the exit pupil. The waves coming from there are recorded by the spatially resolving detectors as an intensity distribution which is processed in the downstream evaluation electronic system and with the aid of the evaluation software. The intelligent evaluation of the detector signals detects the respective optimum imaging zone.

The result of all the distance ranges simultaneously detected by the imaging optical system is a range of advantages both for producing the leveling instrument and for the leveling operation itself. Thus, the working operation of prior focusing by the user is eliminated in each leveling measurement. There is no longer a need to look through an eyepiece or to undertake focusing. The operation of the electronic leveling instrument is simplified thereby.

The focusing lens and the focusing drive are no longer required. This renders their production, assembly and adjustment superfluous, thereby saving costs. Since, in addition, the user no longer has to look through the eyepiece of the telescope, the production, assembly and adjustment of the telescope eyepiece and of the beam splitter assigned to it are rendered superfluous. This beam splitter served to split the beam path in the telescope for the purpose of producing an image both on the optoelectronic detector and on the observer's retina. The leveling rod can be sighted approximately using substantially simpler means such as, for example, marking alignment lines on the leveling instrument, or a simple auxiliary telescope.

By comparison with a leveling instrument having automated focusing by means of a motorized focusing lens, the motorizing superstructures and motor, including its electronic drive, are also eliminated. Moving mechanical and optical components are no longer present. With a fixed geometrical arrangement of the imaging optical system and of the detector or plurality of detectors, the leveling instrument according to the invention has a simple and robust design.

BRIEF DESCRIPTION OF THE DRAWINGS

Exemplary embodiments of the invention are explained below in more detail with the aid of the drawing, in which.

DETAILED DESCRIPTION OF EXEMPLARY EMBODIMENTS

Figure 1:
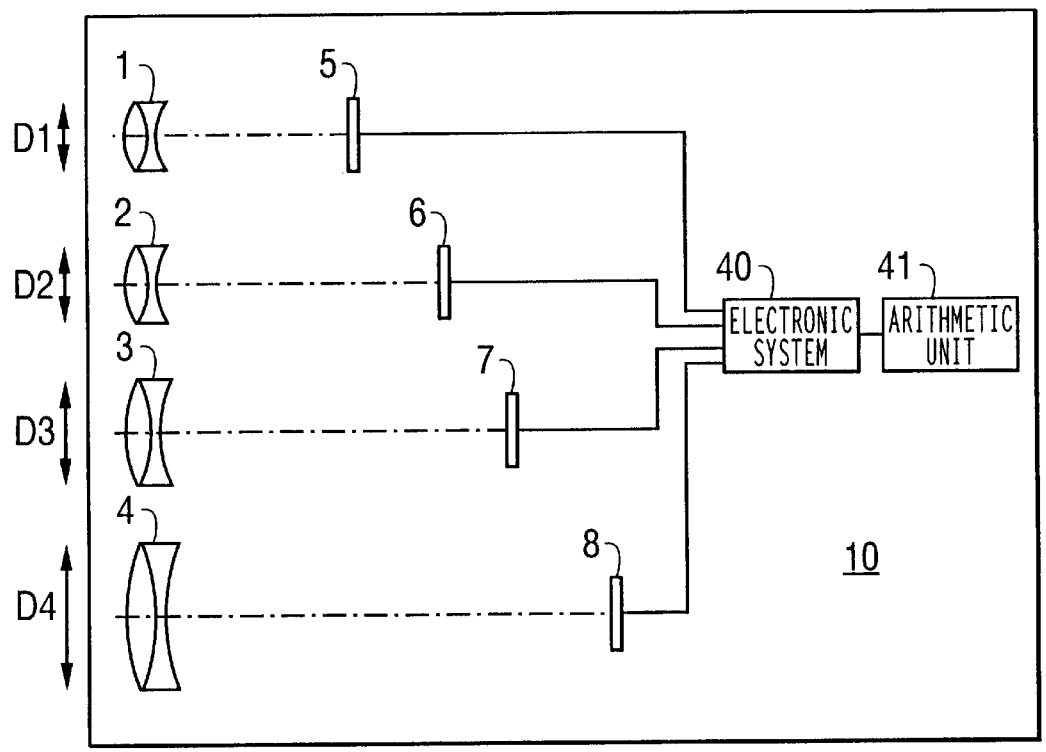
FIG. 1 shows a diagrammatic representation of a leveling instrument with an imaging optical system having individual apertures and having individual detectors assigned to them.

Objectives 1 to 4 of the leveling instrument 10 are represented diagrammatically in FIG. 1 as individual apertures. The objectives 1 to 4 have aperture areas of different size with diameters D1, D2, D3, D4, and permanently set focal lengths of different size, which are indicated by different thicknesses of the objectives. Spatially resolving optoelectronic detectors 5 to 8 are arranged at different, permanently set distances (image distances) from the respective assigned objectives 1 to 4. Each objective/detector pair (1 and 5, 2 and 6, 3 and 7, 4 and 8) images objects in its depth of field. The depths of field are tuned to one another in this case such that they produce a coherent distance range which reaches up to a maximum distance from the leveling instrument 10. The maximum distance can also be infinite.

A leveling rod located within the maximum distance is sharply imaged and recorded by that one of the objective detector pairs (1 and 5, 2 and 6, 3 and 7, 4 and 8) in whose depth of field the instantaneous distance of the leveling rod falls. The electronic system 40 controls the detectors 5 to 8 and receives and processes their signals. The arithmetic unit 41 connected to the electronic system 40 executes the control and evaluation software. The evaluation determines the optimum imaging of the leveling rod. The image of the leveling rod is then further processed in order to determine leveling data, account also being taken, in particular, of an offset of the axis of the measuring system from a reference axis of the instrument, and of the optimization of the distance within the depth of field. The electronic system 40 and the arithmetic unit 41 are integrated in the leveling instrument 10. The arithmetic unit 41 can also be accommodated outside the leveling instrument 10.

Figure 2:
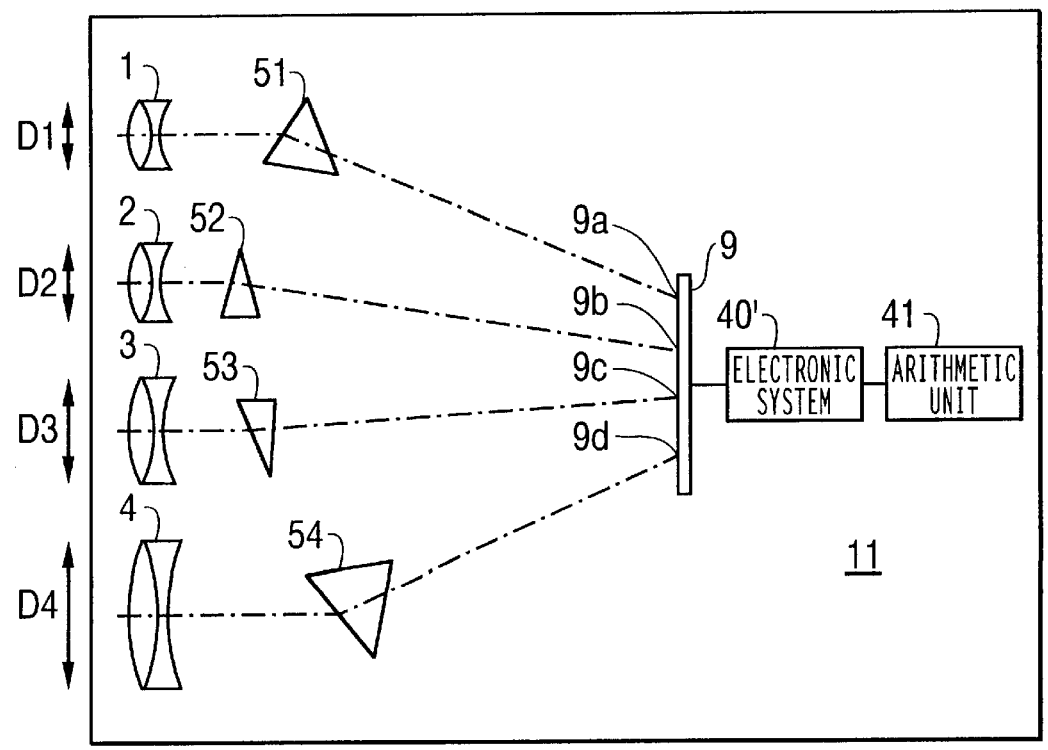
FIG. 2 shows a diagrammatic representation of a leveling instrument with an imaging optical system having individual apertures and having a common detector.

In FIG. 2, the subregions 9a to 9d of a single spatially resolving optoelectronic detector 9 replace the individual detectors 5 to 8 of FIG. 1. The electronic system 40' and the software know the assignment of the subregions 9a to 9d to the objectives 1 to 4. Arranged in the beam paths between the objectives 1 to 4 and the detector 9 are beam-deflecting elements which are represented by way of example as prisms 51 to 54 in FIG. 2. They serve to guide beams between the individual objectives 1 to 4 and the subregions 9a to 9d of the detector 9. The principle of the mode of operation of the leveling instrument 11 according to FIG. 2 is identical to that of the leveling instrument 10 in FIG. 1, and is described with reference to FIG. 1.

Figure 3:
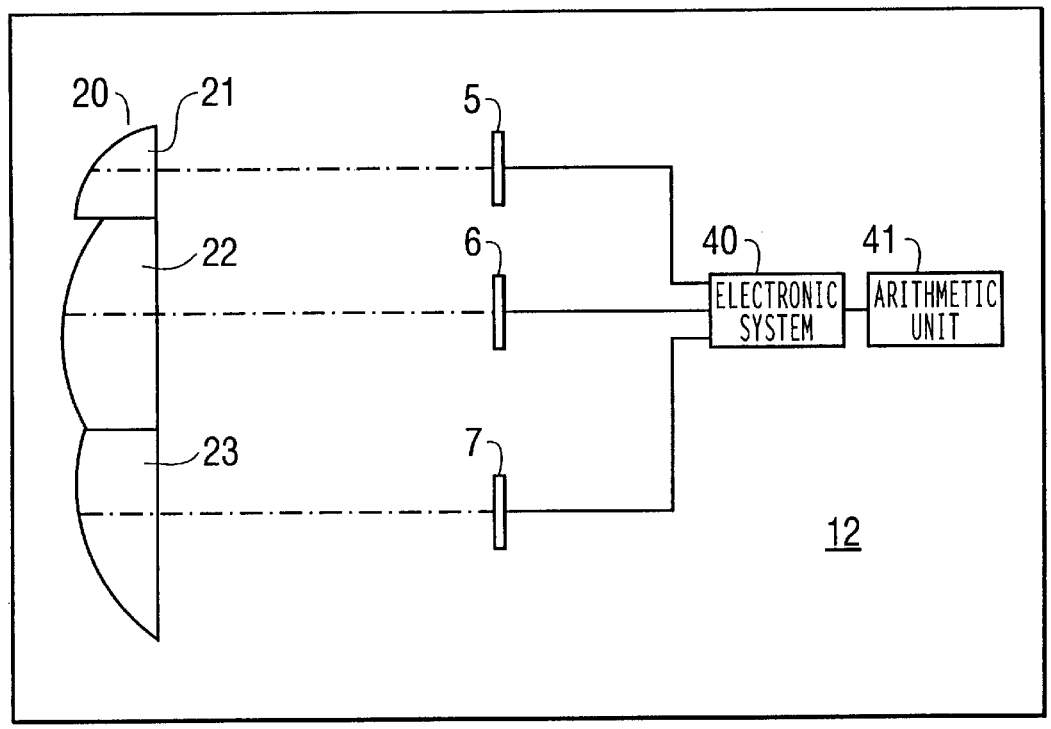
FIG. 3 shows a diagrammatic representation of a leveling instrument with an aperture split into pupil zones and having reflective optical elements and individual detectors.

A different optical design is exhibited by the leveling instrument 12 in FIG. 3. Instead of individual, separately arranged apertures, differently imaging pupil zones 21, 22 and 23 are grouped together in one aperture 20. The pupil zones 21, 22 and 23 comprise refractive optical elements of different refractive power and thus of different focal lengths. In this exemplary embodiment, the image distances are kept to the same size, and use is made of individual detectors 5, 6 and 7 assigned to the pupil zones 21, 22 and 23. The different depths of field of the pupil zones 21, 22 and 23 together yield the possible distance range within which a leveling rod is sharply imaged on one of the detectors. As in the previous figures, the electronic system 40 and the arithmetic unit 41 have the purpose of detector control and image evaluation.

Figure 4:
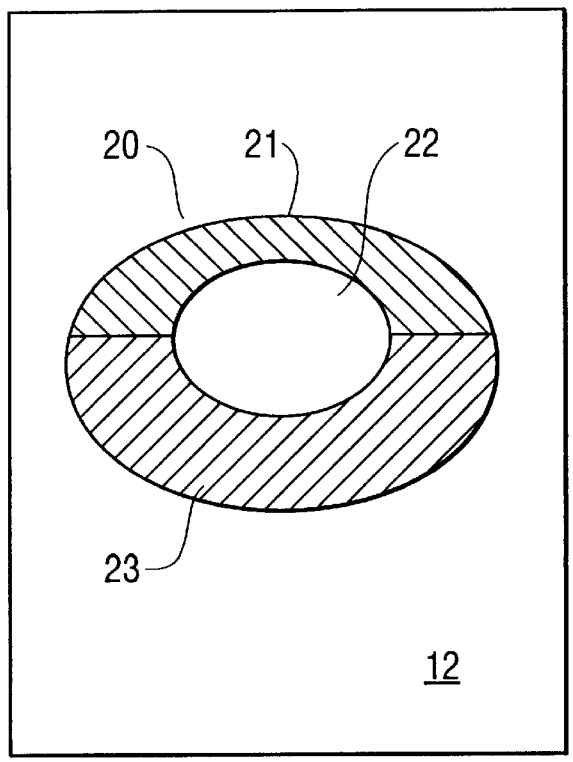
FIG. 4 shows a diagrammatic representation of the front view of the leveling instrument from FIG. 3.

FIG. 4 shows a front view of the leveling instrument 12 of FIG. 3. For the light admission, the pupil zones 21, 22 and 23 have aperture areas which are of different size and are differently shaped. Because of its larger aperture area, the pupil zone 23 also collects a larger quantity of light. As a result, lower light intensities owing to a leveling rod set up at greater distances are compensated at least in part. Consequently, pupil zones with larger aperture areas are designed for larger distance ranges.

In order simultaneously to obtain a compact design of the imaging optical system 20, the aperture areas of the pupil zones 21, 22 and 23 abut one another as optimally as possible, resulting in different shapes. Going beyond the pupil zones 21, 22 and 23 represented in FIG. 3 and FIG. 4, it is possible by means of a different split or by extension to produce a larger number of aperture areas. In turn, the latter are assigned individual detectors or detector areas of a common detector in accordance with the arrangement of the aperture areas.

Figure 5:
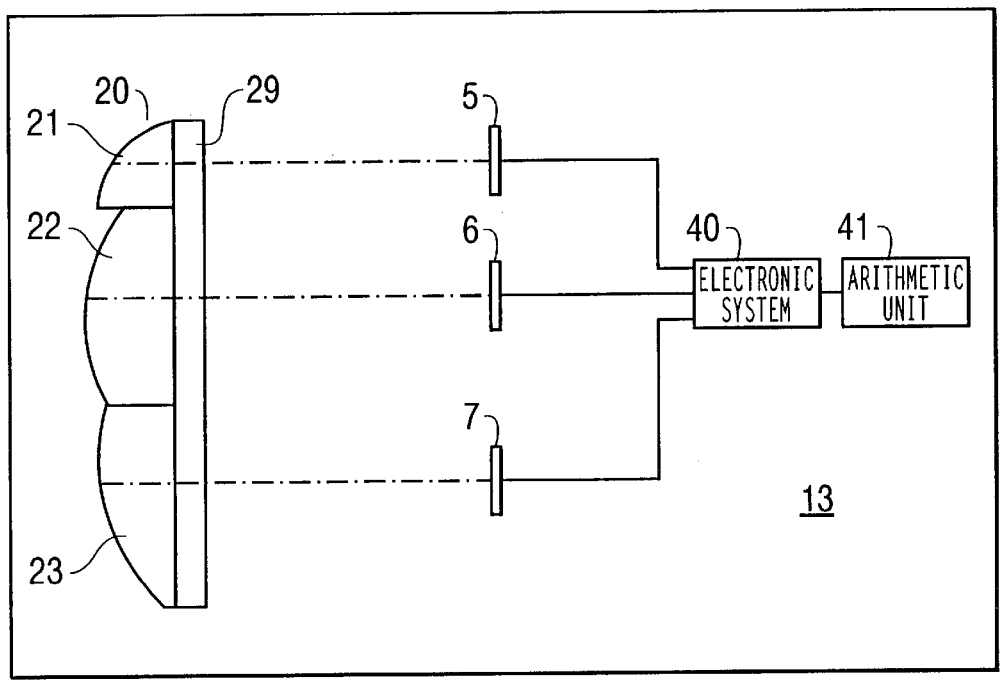
FIG. 5 shows a diagrammatic representation of a leveling instrument with an aperture split into pupil zones, having refractive optical elements and having a diffractive correction element.

In FIG. 5, the imaging optical system 20 of the leveling instrument 13 differs from the imaging optical system 20 of the leveling instrument 12 from FIG. 3 by an additionally mounted diffractive optical element 29. The diffractive optical element 29 corrects the images produced by the refractive pupil zones 21, 22 and 23. It can be produced from a glass plate on whose surface diffractive structures are vapor-deposited, or are etched into the surface. Such structures can also be applied directly to the refractive pupil zones 21, 22 and 23.

Figure 6:
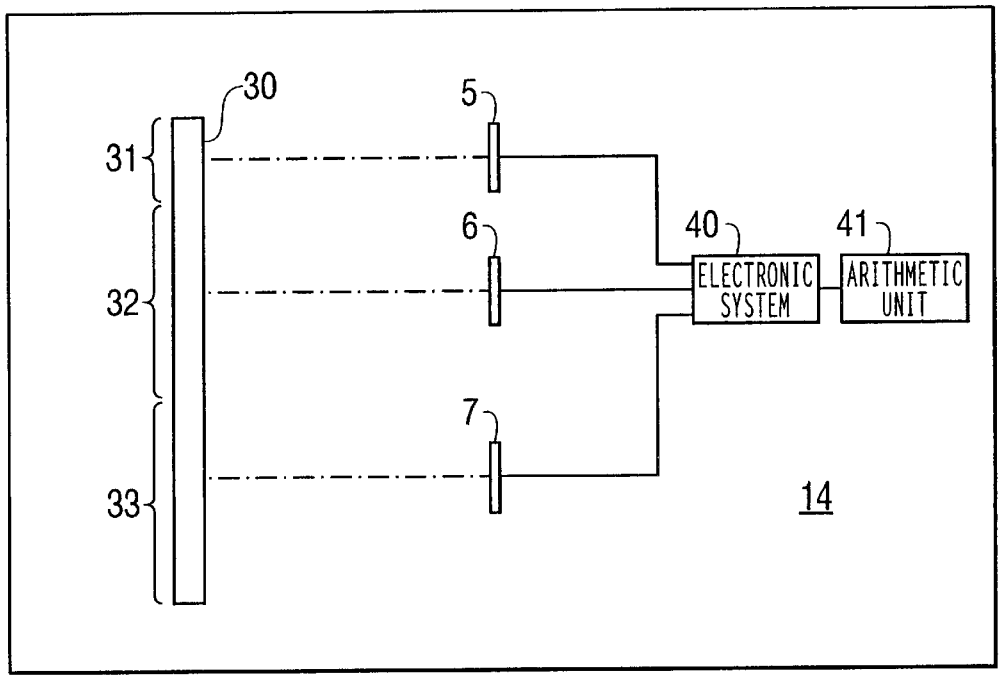
FIG. 6 shows a diagrammatic representation of a leveling instrument with a diffractive optical element, split into pupil zones, as an imaging optical system.

In FIG. 6, the imaging optical system of the leveling instrument 14 comprises exclusively a diffractive optical system 30. The diffractive optical system 30 is also split into different pupil zones 31, 32 and 33, which image different depths of field onto the correspondingly assigned detectors 5, 6 and 7 by diffraction.

Figure 7:
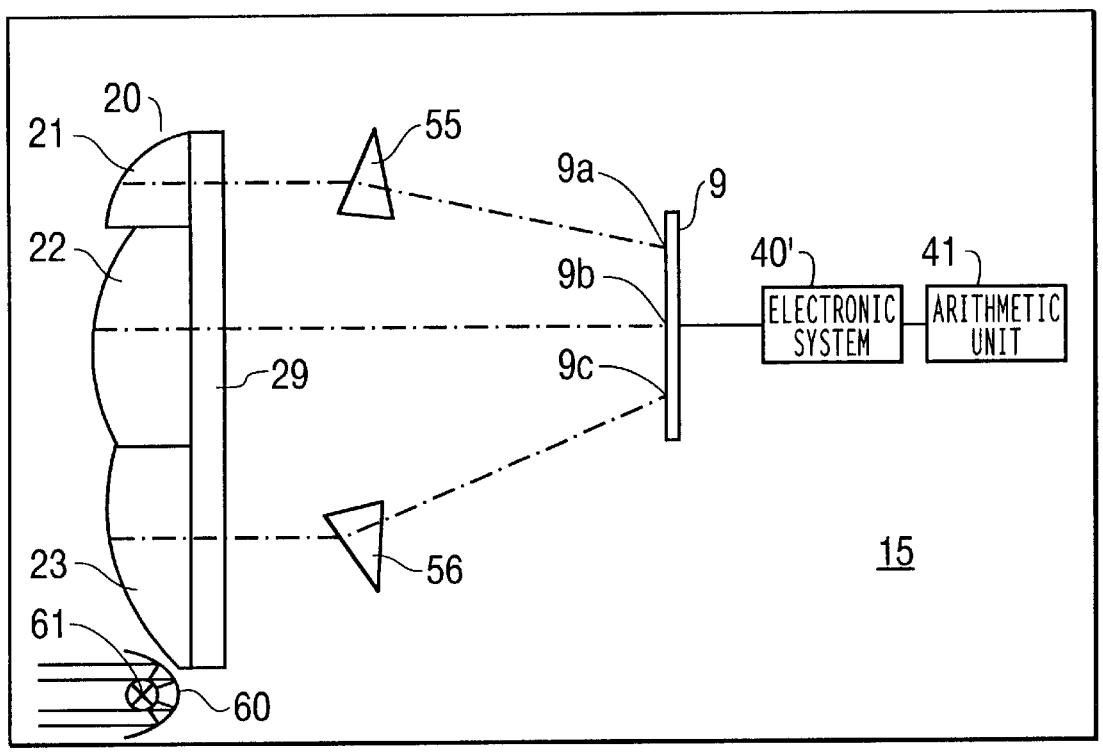
FIG. 7 shows a diagrammatic representation of a leveling instrument with an aperture split into pupil zones and a common detector.

Finally, an imaging optical system 20 as in FIG. 5 and a detector 9 as in FIG. 2 are represented in FIG. 7. The subregions 9a, 9b and 9c of the detector 9 are here assigned to the differently imaging pupil zones 21, 22 and 23. The prisms 55 and 56 serve as beam-deflecting elements of the beam guidance between the pupil zones 21, 22 and 23 and the detector regions 9a, 9b and 9c.

An electronic system 40' and an arithmetic unit 41 are connected downstream of the detector 9 for the purposes of control and evaluation. In addition, a spotlight 60 is provided for illuminating the object to be recorded, and is integrated in the leveling instrument 15. The light source 61 of the spotlight 60 can be a laser diode emitting in the infrared.

We claim:

1. A leveling instrument having an imaging optical system (1–4; 20) and a spatially resolving optoelectronic detector (5–8; 9), and having an electronic system (40; 40') and an arithmetic unit (41) for controlling the detector and for image evaluation, wherein for the purpose of producing sharp images from different distance ranges the imaging optical system (1–4; 20) has at least two differently imaging pupil zones (1–4; 21–23) simultaneously imaging light from different distance ranges and wherein the detector simultaneously receives spatially separated images from the at least two differently imaging pupil zones.

2. An instrument according to claim 1, wherein the differently imaging pupil zones (1–4; 21–23) have permanently set focal lengths of different size.

3. An instrument according to claim 1, wherein the differently imaging pupil zones (1–4; 21–23) have permanently set image distances of different size.

4. An instrument according to claim 1, wherein the differently imaging pupil zones (1–4; 21–23) have permanently set focal lengths of the same size, but permanently set image distances of different size.

5. An instrument according to claim 1, wherein the differently imaging pupil zones (1–4; 21–23) have aperture areas (D1, D2, D3, D4; 21, 22, 23) of different size.

6. An instrument according to claim 1, wherein the differently imaging pupil zones (1–4; 21–23) have aperture areas (D1, D2, D3, D4; 21, 22, 23) of different shape.

7. An instrument according to claim 1, wherein the differently imaging pupil zones (1–4) are formed by individual, separately arranged apertures (1–4).

8. An instrument according to claim 1, wherein the differently imaging pupil zones (21–23) are formed together in a single aperture (20).

9. An instrument according to claim 1, wherein the differently imaging pupil zones (1–4; 21–23) are formed by refractive (21, 22, 23) and/or diffractive (29; 30) optical elements.

10. An instrument according to claim 1, wherein the spatially resolving optoelectronic detector includes a plurality of spatially resolving detectors and wherein the differently imaging pupil zones (1–4; 21–23) are respectively assigned to one of the plurality of spatially resolving detectors (5–8).

11. An instrument according to claim 1, wherein the differently imaging pupil zones (1–4; 21–23) are respectively assigned to a subregion (9a–9d) on the spatially resolving optoelectronic detector (9).

12. An instrument according to claim 11, wherein the assignment is performed by beam-deflecting optics (51–54).

13. An instrument according to claim 12, wherein the beam-deflecting optics are prisms (51–54).

14. An instrument according to claim 1, further comprising an integrated spotlight (60) for illuminating the object to be imaged.

15. An instrument according to claim 14, wherein the light source (61) of the spotlight (60) is a laser diode (61).

16. A leveling instrument to determine distance relative to a leveling rod, the leveling instrument comprising:

an imaging optical system, the imaging optical system having at least two differently imaging pupil zones for simultaneously imaging light from at least two different distance ranges;

a spatially resolving optoelectronic detector to simultaneously receive spatially separated images from said at least two differently imaging pupil zones of the imaging optical system; and an electronic system and arithmetic unit to control the detector and to evaluate images from the detector.

17. An instrument according to claim 16, wherein the differently imaging pupil zones have permanently set focal lengths of different size.

18. An instrument according to claim 16, wherein the differently imaging pupil zones have permanently set image distances of different size.

19. An instrument according to claim 16, wherein the differently imaging pupil zones have permanently set focal lengths of the same size, but permanently set image distances of different size.

20. An instrument according to claim 16, wherein the differently imaging pupil zones have aperture areas of different size.

21. An instrument according to claim 16, wherein the differently imaging pupil zones have aperture areas of different shape.

22. An instrument according to claim 16, wherein the differently imaging pupil zones are formed by individual, separately arranged apertures.

23. An instrument according to claim 16, wherein the differently imaging pupil zones are formed together in a single aperture.

24. An instrument according to claim 16, wherein the differently imaging pupil zones are formed by at least one of refractive optical elements and diffractive optical elements.

25. An instrument according to claim 16, wherein the spatially resolving optoelectronic detector includes a plurality of spatially resolving detectors and wherein the differently imaging pupil zones are respectively assigned to one of the plurality of spatially resolving detectors.

26. An instrument according to claim 16, wherein the differently imaging pupil zones are respectively assigned to a subregion on the spatially resolving optoelectronic detector.

27. An instrument according to claim 26, wherein the assignment is performed by beam-deflecting optics.

28. An instrument according to claim 27, wherein the beam-deflecting optics includes prisms.

29. An instrument according to claim 16, further comprising an integrated spotlight for illuminating the leveling rod.

30. An instrument according to claim 29, wherein a light source of the spotlight is a laser diode.

* * * * *